United States Patent
Liang et al.

(10) Patent No.: US 8,768,085 B2
(45) Date of Patent: Jul. 1, 2014

(54) HADAMARD TRANSFORM-BASED IMAGE COMPRESSION CIRCUIT AND METHOD THEREOF

(75) Inventors: Ren Kuan Liang, Hsinchu Hsien (TW); Jen-shi Wu, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 870 days.

(21) Appl. No.: 12/953,722

(22) Filed: Nov. 24, 2010

(65) Prior Publication Data
US 2011/0129163 A1 Jun. 2, 2011

(30) Foreign Application Priority Data
Dec. 1, 2009 (TW) .............................. 98140923 A

(51) Int. Cl.
G06K 9/36 (2006.01)
G06K 9/46 (2006.01)
G06K 9/00 (2006.01)

(52) U.S. Cl.
USPC ............ 382/248; 382/239; 382/251; 382/281

(58) Field of Classification Search
USPC .................................. 382/239, 248, 251, 281
See application file for complete search history.

(56) References Cited

U.S. PATENT DOCUMENTS

| | | | |
|---|---|---|---|
| 6,222,946 B1* | 4/2001 | Abe | 382/281 |
| 2003/0156647 A1* | 8/2003 | Wu | 375/240.16 |
| 2010/0034478 A1* | 2/2010 | Kajiwara et al. | 382/248 |
| 2010/0104215 A1* | 4/2010 | Nakayama | 382/281 |

FOREIGN PATENT DOCUMENTS

| | | | |
|---|---|---|---|
| JP | 2004-289290 A | * | 10/2004 |
| JP | 2007096479 A | * | 4/2007 |

* cited by examiner

Primary Examiner — Bernard Krasnic
(74) Attorney, Agent, or Firm — Edell, Shapiro & Finnan, LLC

(57) ABSTRACT

A Hadamard transform-based image compression method includes performing a Hadamard transform on $2^k$ pixel values according to a product of a $2^k \times 2^k$ stage Hadamard matrix and a $2^k \times 2^k$ adjustment matrix to generate $2^k$ conversion values, where k is a positive integer and at least one of the $2^k$ conversion values is zero. The adjustment matrix satisfies a condition that: when the $2^k$ pixel values are divided into G pixel groups each comprising $2^k/G$ adjacent pixels values and the adjustment matrix is multiplied with a first $2^k \times 1$ matrix formed by the $2^k$ pixel values to transform the first $2^k \times 1$ matrix to a second $2^k \times 1$ matrix, each pixel value of the first matrix is transformed to an average of a pixel group comprising the pixel value to form the second $2^k \times 1$ matrix.

11 Claims, 6 Drawing Sheets

HADAMARD TRANSFORM-BASED IMAGE COMPRESSION CIRCUIT AND METHOD THEREOF

CROSS REFERENCE TO RELATED PATENT APPLICATION

This patent application is based on Taiwan, R.O.C. patent application No. 098140923 filed on Dec. 1, 2009.

FIELD OF THE INVENTION

The present invention relates to image compression, and more particularly, to a Hadamard transform-based image compression circuit and a method thereof.

BACKGROUND OF THE INVENTION

A Hadamard transform technique is a common technique applied to image compression. In the prior art, when a forward Hadamard transform (mentioned as a Hadamard transform in the following description) is performed on an image (i.e., a statistic frame), eight pixels in a same scan line forms an image block unit, and an 8×1 matrix generated from multiplying an eight-stage (i.e., 8×8) Hadamard matrix with the eight pixel values is frequency transformed. The eight matrix elements of the 8×1 matrix are transformed values calculated as:

$$H_8 * P[8] = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \begin{bmatrix} P0 \\ P1 \\ P2 \\ P3 \\ P4 \\ P5 \\ P6 \\ P7 \end{bmatrix} = \begin{bmatrix} DC \\ AC0 \\ AC1 \\ AC2 \\ AC3 \\ AC4 \\ AC5 \\ AC6 \end{bmatrix} \quad (1)$$

In Equation 1, $H_8$ is the eight-stage Hadamard matrix, P[8] is the 8×1 matrix formed by eight pixels P0 to P7, $H_8*P[8]$ is an 8×1 matrix comprising eight transformed values, i.e., one direct current (DC) value and seven alternating current (AC) values AC0 to AC6, where the DC value represents an average of the eight pixels P0 to P7, and AC0 to AC6 represents in sequence low-frequency components to high-frequency components. After the Hadamard transformed is performed, the transformed values are quantized, i.e., several least significant bits (LSBs) of the transformed values are abandoned to reduce bits and thereby achieving an object of image compression.

One advantage of the Hadamard transform is that, when an Hadamard inverse transform is performed, an inverse Hadamard matrix is the Hadamard matrix for the previous positive transform. For Equation 1, when $H_8^{-1}$ represents an inverse matrix of $H_8$, $H_8^{-1}$ is equal to $H_8$. Another advantage of the Hadamard transform is that only simple addition and subtraction are performed in the Hadamard inverse transform as seen from Equation 1.

Due to the foregoing advantages of the Hadamard transform, an image compression circuit based on the Hadamard transform has better flexibility and higher efficiency to achieve better image compression effect.

DETAILED DESCRIPTION OF THE PREFERRED EMBODIMENT

Before an embodiment of the present invention is disclosed, an approach for generating a $2^k$-stage (i.e., $2^k \times 2^k$) Hadamard matrix, where k is a positive integer. When H is a d-stage Hadamard matrix, a 2d-stage Hadamard matrix is generated via $$\begin{bmatrix} H & H \\ H & -H \end{bmatrix}.$$

By iterating the process, a one-stage Hadamard matrix, a two-stage Hadamard matrix, a four-stage Hadamard matrix, and the like, are in sequence calculated as:

$$H_1 = [1]$$

$$H_2 = \begin{bmatrix} 1 & 1 \\ 1 & -1 \end{bmatrix}$$

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \ldots$$

Accordingly, any $2^k$-stage Hadamard matrix is generated via the foregoing approach.

Figure 1:
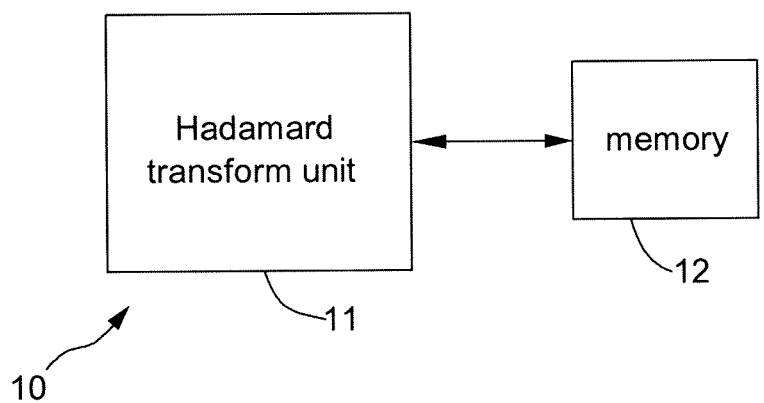
FIG. 1 is block diagram of an image compression circuit in accordance with a first embodiment of the present invention.

Following description of embodiments discloses image compression based on the Hadamard transform to provide an image compression function with better flexibility and higher efficiency. In the following embodiments, an image is a statistic frame or a statistic film, and a pixel value is a luminance value or a chrominance value of a pixel. FIG. 1 is a block diagram of an image compression circuit in accordance with a first embodiment of the present invention. An image compression circuit 10 comprises a Hadamard transform unit 11 and a memory 12. The Hadamard transform unit 11 performs a Hadamard transform on $2^k$ pixel values according to a $2^k$-stage Hadamard matrix to generate $2^k$ transformed values.

Therefore, in the first embodiment, $2^k$ pixels regarded as an image block for the Hadamard transform may be in a same scan line (i.e., a $1 \times 2^k$ image block) or in $2^m$ scan lines (i.e., a $2^m \times 2^{k-m}$ image block), where m is a positive integer. Upon performing the Hadamard transform, the Hadamard transform unit 11 multiplies a $2^k \times 2^k$ Hadamard matrix with a $2^k \times 1$ matrix formed by the $2^k$ pixel values to generate a $2^k \times 1$ matrix comprising $2^k$ matrix elements, which are the transformed values including one DC value and $2^k-1$ AC values. The $2^k-1$ AC values cover from negative to positive, and thus each of the AC values has a sign bit (i.e., a first MSB) and a magnitude part composed of remaining bits. A range of the DC value is not smaller than zero, and thus all bits of the DC value form a magnitude part without a sign bit.

In order to achieve image compression, the Hadamard transform unit 11 quantizes at least one transformed value to reduce an overall bit number of the $2^k$ transformed values. More specifically, the Hadamard transform unit 11 defines in advance to-be-quantized transformed values and a quantization bit number of each of the to-be-quantized transformed values. Since human eyes are sensitive to low-frequency (LF) image signals, more bits of an LF transformed value are maintained to be quantized while less bits of a high-frequency (HF) transformed value are maintained for quantization. After that, according to the defined quantization bit number (represented by b), the Hadamard transform unit 11 maintains first b MSBs of a transformed value and remaining bits are abandoned for the quantization. Another approach is that, when a (b+1)th MSB of the transformed value is "1", the (b+1)th MSB is carried to the bth MSB and the first b MSBs of the carried transformed value are maintained while remaining bits of the carried transformed value are abandoned; when the (b+1)th MSB of the transformed value is "0", the transformed value is not carried and the original first b MSBs are maintained while remaining bits of the transformed value are directly abandoned. Upon completing the quantization, the Hadamard transform unit stores all of the quantized transformed values and un-quantized transformed values into the memory 12.

It is to be noted that, out of the $2^k$ transformed values, at least one transformed value (e.g., the first transformed value in the first embodiment) having a magnitude part that comprises first n MSBs of "0", where n is a positive integer. Supposing that the first transformed value need not be quantized, when the Hadamard transform unit 11 stores the first transformed value into the memory 12, the first n MSBs of the magnitude part are omitted and a corresponding omit record. Supposing that the first transformed value needs quantization, when the Hadamard transform unit 11 quantizes the first transformed value, the first n MSBs of the magnitude part are first omitted and the omit record is generated, and remaining bits of the first transformed value are then quantized and stored into the memory 12. The foregoing omit record is also stored into the memory 12, and a format of the omit record has not limitations provided that the omit record records transformed values of which MSBs are omitted and the number of the omitted MSBs. The omit record is for recovering the transformed values stored in the memory 12 for image decompression to accurately perform the Hadamard inverse transform. The approach of omitting the first n MSBs of "0" has two advantages—a bit number of bits stored into the memory 12 is reduced to reduce memory space when n is large or the number of the first transform value becomes larger, and more information associated with the quantized omitted first transformed value remains unchanged to improve image quality when the first transformed values needs quantization. To achieve image compression, after the foregoing quantization and omit processing, a sum of an overall bit number of the transformed values stored into the memory 12 and a bit number of omitted bits is smaller than an overall bit number of the $2^k$ pixel values.

Preferably, the Hadamard transform unit 11 only performs the foregoing omit processing when first n MSBs of magnitude parts of $2^k-1$ AC values of the $2^k$ transformed values are "0", i.e., when one AC value is stored into the memory 12, regardless of whether the AC value has been quantized, the first n MSBs of "0" of its magnitude part are omitted and not stored into the memory 12. Since it is determined in advance the transformed values the omit processing is performed on, the omit record only records a value of n to reduce a bit number of the omit record. For example, when k equals 3 and each of the pixel values has 8 bits (i.e., a pixel value range is from 0 to 255), according to Formula 1, the AC values AC0 to AC6 are within a range from $-(255*4)$ to $+(255*4)$, such that each of the AC value has 11 bits including one sign bit and a magnitude part of 10 bits. The value of n is calculated as: when $2^8 <= \max(|ACx|) < 2^9$, where x is within 0 to 6, n is equal to 1; when $2^7 <= \max(|ACx|) < 2^8$, n is equal to 2, and so on, where max( ) means obtaining a maximum value.

Figure 2:
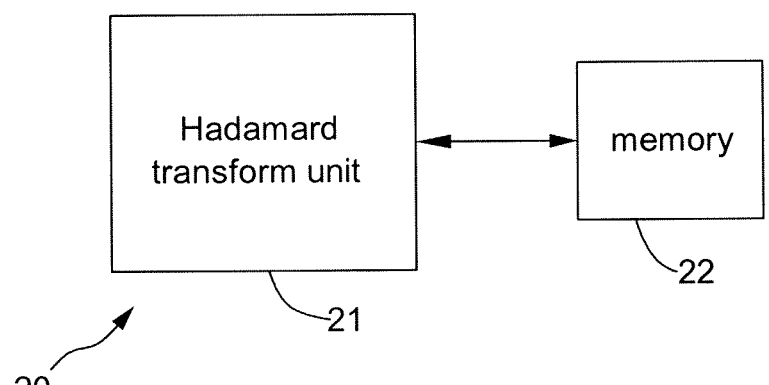
FIG. 2 is a block diagram of an image compression circuit in accordance with a second embodiment of the present invention.

FIG. 2 is a block diagram showing an image compression circuit in accordance with a second embodiment of the present invention. An image compression circuit 20 comprises a Hadamard transform unit 21 and a memory 22. The Hadamard transform unit 21 performs Hadamard transform on $2^k$ pixel values according to a product of a $2^k \times 2^k$ Hadamard matrix and a $2^k \times 2^k$ adjustment matrix to generate $2^k$ transformed values including at least one transformed value of "0". When an overall bit number of non-zero transformed values is not smaller than that of the $2^k$ pixel values, the Hadamard transform unit 21 quantized at least one non-zero transformed value, so that an overall bit value of quantized and un-quantized non-zero transformed values is smaller than that of the $2^k$ pixel values to achieve image compression. After that, the Hadamard transform unit 21 stores all of the quantized and un-quantized non-zero transformed values into the memory 22 for subsequent image compression. In another embodiment, the Hadamard transform unit 21 in advance defines an image compression rate and determines to-be-quantized non-zero transformed values and a bit number of each of the to-be-quantized non-zero transformed values according to the image compression rate, such that the overall bit number of the quantized and un-quantized non-zero transformed values is equal to that to that of the $2^k$ pixel values to realize the image compression rate. For example, when k is equal to 3 and each of the pixel values has 8 bits, the overall bit number of the $2^k$ pixel values is 64. At this point, supposing that the image compression rate is 75%, the overall bit number of the quantized and un-quantized non-zero transformed values is equal to 48 (64*75%).

One property of the second embodiment is that, a simplified Hadamard matrix is generated from multiplying the Hadamard matrix by the adjustment matrix. Through a Hadamard transform using the simplified Hadamard matrix, at least one of the $2^k$ transformed values is equal to zero to achieve a higher image compression rate, or to maintain more to-be-quantized bits for quantizing the transformed values. The adjustment matrix satisfies following condition that, when the $2^k$ pixel values are divided into G pixel groups each comprising $2^k/G$ adjacent pixel values and the adjustment matrix is multiple by a first $2^k \times 1$ matrix composed of the $2^k$ pixel values to transform the first $2^k \times 1$ matrix to a second $2^k \times 1$ matrix, each pixel value of the first $2^k \times 1$ matrix is transformed to an average pixel value of a pixel group comprising the pixel value to form the second $2^k \times 1$ matrix. Following examples are for disclosing how to generate the adjustment matrix.

Figure 3A:
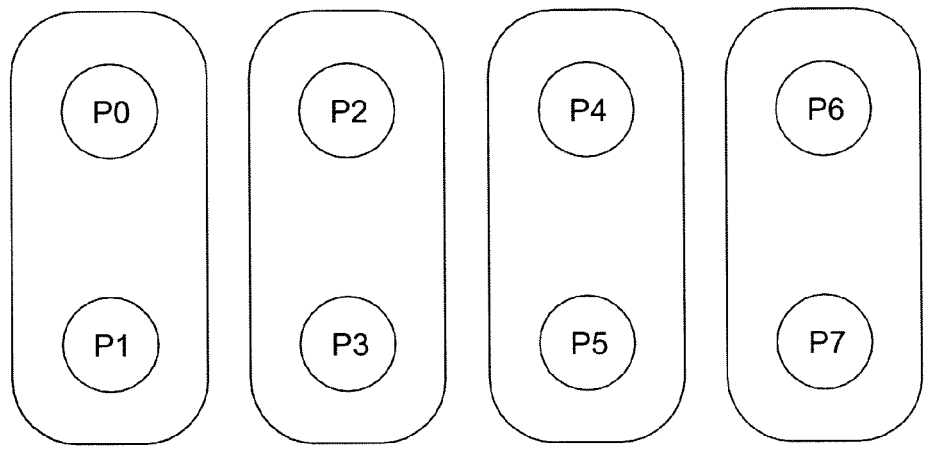
FIG. 3A is an illustration of dividing eight pixel values of a 2×4 matrix into four pixel groups.

In Example 1, G is equal to $2^{k-1}$, and each of the pixel groups comprises two vertical-adjacent pixel values. Taking k equal to 3 as an example, $2^k=8$ pixel values regarded as an image block for the Hadamard transform are divided into G=4 pixel groups. Supposing that the eight pixel values (represented by P0 to P7) correspond to two scan lines, i.e., the eight pixel values form a 2×4 image block, with corresponding vertical-adjacent pixel values P1, P3, P5 and P7, pixel values P0, P2, P4 and P6 respectively form a pixel group, as shown in FIG. 3A. At this point, an adjustment matrix (represented by Av in Example 1) satisfies following Formula 2:

$$Av*M1 = Av* \begin{bmatrix} P0 \\ P1 \\ P2 \\ P3 \\ P4 \\ P5 \\ P6 \\ P7 \end{bmatrix} = M2 = \begin{bmatrix} \frac{P0+P1}{2} \\ \frac{P0+P1}{2} \\ \frac{P2+P3}{2} \\ \frac{P2+P3}{2} \\ \frac{P4+P5}{2} \\ \frac{P4+P5}{2} \\ \frac{P6+P7}{2} \\ \frac{P6+P7}{2} \end{bmatrix} \quad (2)$$

From Formula 2, each pixel value of a first matrix M1 is transformed to an average pixel value of a pixel group comprising the pixel value to from a second matrix M2. Accordingly, the adjustment matrix Av is:

$$Av = \frac{1}{2} \begin{bmatrix} 1 & 1 & 0 & 0 & 0 & 0 & 0 & 0 \\ 1 & 1 & 0 & 0 & 0 & 0 & 0 & 0 \\ 0 & 0 & 1 & 1 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 1 & 1 \end{bmatrix}$$

By multiplying an eight-stage Hadamard matrix $H_8$ by the adjustment Av, a simplified eight-stage Hadamard matrix is:

$$H_8 * Av = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Hadamard transform is performed on the pixel values P0 to P7 via the substantially simplified eight-stage Hadamard matrix to obtain:

$$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} * \begin{bmatrix} P0 \\ P1 \\ P2 \\ P3 \\ P4 \\ P5 \\ P6 \\ P7 \end{bmatrix} = \begin{bmatrix} DC \\ AC0 \\ AC1 \\ AC2 \\ 0 \\ 0 \\ 0 \\ 0 \end{bmatrix}$$

That is, the generated eight transformed values include one DC value, three AC values AC0 to AC2, and remaining four values of zero.

Figure 3B:
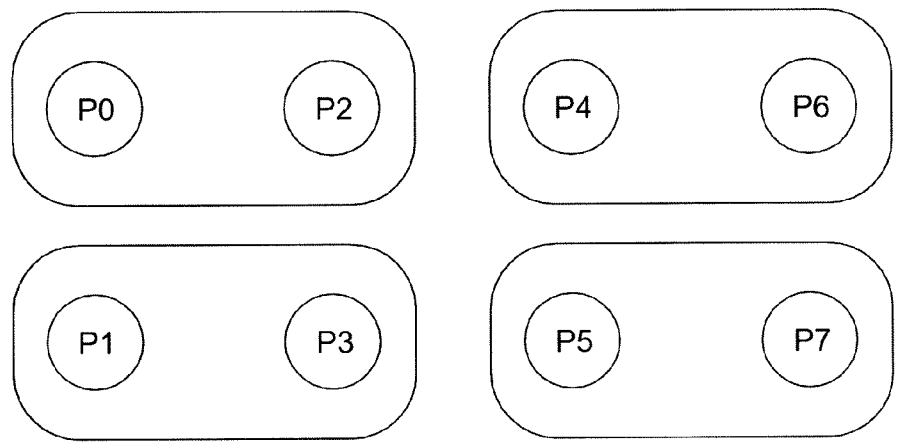
FIG. 3B is an illustration of dividing eight pixel values of a 2×4 matrix into four pixel groups.

In Example 2, G is equal to $2^{k-1}$ and each of the pixel groups comprises two horizontal-adjacent pixel values. Taking k equal to 3 as an example, eight pixel values regarded as an image block for the Hadamard transform are divided into G=4 pixel groups. Supposing that the eight pixel values (represented by P0 to P7) correspond to two scan lines, with corresponding horizontal-adjacent pixel values P2, P3, P6 and P7, pixel values P0, P1, P4 and P5 respectively form a pixel group, as shown in FIG. 3B. At this point, an adjustment matrix (represented by Ah in Example 2) satisfies following Formula 3:

$$Ah*M1 = Ah* \begin{bmatrix} P0 \\ P1 \\ P2 \\ P3 \\ P4 \\ P5 \\ P6 \\ P7 \end{bmatrix} = M2 = \begin{bmatrix} \frac{P0+P2}{2} \\ \frac{P0+P2}{2} \\ \frac{P1+P3}{2} \\ \frac{P1+P3}{2} \\ \frac{P4+P6}{2} \\ \frac{P4+P6}{5} \\ \frac{P5+P7}{2} \\ \frac{P5+P7}{2} \end{bmatrix} \quad (3)$$

From Formula 3, each pixel value of a first matrix M1 is transformed to an average pixel value of a pixel group comprising the pixel value to from a second matrix M2. Accordingly, the adjustment matrix Ah is:

$$Ah = \frac{1}{2} \begin{bmatrix} 1 & 0 & 1 & 0 & 0 & 0 & 0 & 0 \\ 0 & 1 & 0 & 1 & 0 & 0 & 0 & 0 \\ 1 & 0 & 1 & 0 & 0 & 0 & 0 & 0 \\ 0 & 1 & 0 & 1 & 0 & 0 & 0 & 0 \\ 0 & 0 & 0 & 0 & 1 & 0 & 1 & 0 \\ 0 & 0 & 0 & 0 & 0 & 1 & 0 & 1 \\ 0 & 0 & 0 & 0 & 1 & 0 & 1 & 0 \\ 0 & 0 & 0 & 0 & 0 & 1 & 0 & 1 \end{bmatrix}$$

By multiplying an eight-stage Hadamard matrix $H_8$ by the adjustment Av, a substantially simplified eight-stage Hadamard matrix is calculated as:

$$H_8 * Ah = \begin{bmatrix} 1 & 1 & 1 & 1 & 1 & 1 & 1 & 1 \\ 1 & 1 & 1 & 1 & -1 & -1 & -1 & -1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & -1 & 1 & -1 & -1 & 1 & -1 & 1 \\ 1 & -1 & 1 & -1 & 1 & -1 & 1 & -1 \end{bmatrix}$$

Hadamard transform is performed on the pixel values P0 to P7 via the substantially simplified eight-stage Hadamard matrix to obtain:

$$\begin{bmatrix} 1 & 1 & 1 & 1 & 1 & 1 & 1 & 1 \\ 1 & 1 & 1 & 1 & -1 & -1 & -1 & -1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & -1 & 1 & -1 & -1 & 1 & -1 & 1 \\ 1 & -1 & 1 & -1 & 1 & -1 & 1 & -1 \end{bmatrix} * \begin{bmatrix} P0 \\ P1 \\ P2 \\ P3 \\ P4 \\ P5 \\ P6 \\ P7 \end{bmatrix} = \begin{bmatrix} DC \\ AC0 \\ 0 \\ 0 \\ 0 \\ 0 \\ AC5 \\ AC6 \end{bmatrix}$$

That is, the generated eight transformed values include one DC value, three AC values AC0, AC5 and AC6, and remaining four values of zero.

Figure 3C:
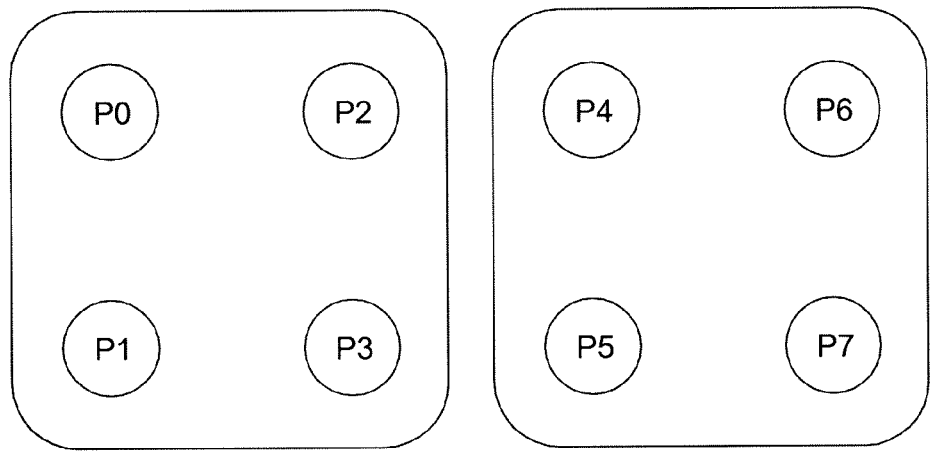
FIG. 3C is an illustration of dividing eight pixel values of a 2×4 matrix into two pixel groups.

In Example 3, G is equal to $2^{k-2}$, and each of the pixel groups comprises four pixel values arranged as 2×2, i.e., each of the pixel groups is a 2×2 image block. Likewise, taking k equal to 3 as an example, eight pixel values regarded as an image block are divided into two pixel groups. Supposing that eight pixel values P0 to P7 correspond to two scan lines, P0 and adjacent pixels P1, P2 and P3 form a pixel group, and P4 and adjacent pixels P5, P6 and P7 form another pixel group, as shown in FIG. 3C. At this point, the adjustment matrix (represented by Aq in Example 3) satisfies Formula 4:

$$Aq * M1 = Aq * \begin{bmatrix} P0 \\ P1 \\ P2 \\ P3 \\ P4 \\ P5 \\ P6 \\ P7 \end{bmatrix} = M2 = \begin{bmatrix} \frac{P0+P1+P2+P3}{4} \\ \frac{P0+P1+P2+P3}{4} \\ \frac{P0+P1+P2+P3}{4} \\ \frac{P0+P1+P2+P3}{4} \\ \frac{P4+P5+P6+P7}{4} \\ \frac{P4+P5+P6+P7}{4} \\ \frac{P4+P5+P6+P7}{4} \\ \frac{P4+P5+P6+P7}{4} \end{bmatrix} \quad (4)$$

From Formula 4, each pixel value of a first matrix M1 is transformed to an average pixel value of a pixel group comprising the pixel value to from a second matrix M2. Accordingly, the adjustment matrix Aq is:

$$Aq = \frac{1}{4}\begin{bmatrix} 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 0 & 0 & 0 & 0 & 1 & 1 & 1 & 1 \\ 0 & 0 & 0 & 0 & 1 & 1 & 1 & 1 \\ 0 & 0 & 0 & 0 & 1 & 1 & 1 & 1 \\ 0 & 0 & 0 & 0 & 1 & 1 & 1 & 1 \end{bmatrix}$$

By multiplying an eight-stage Hadamard matrix $H_8$ by the adjustment matrix Aq, a substantially simplified eight-stage Hadamard matrix is calculated as:

$$H_8 * Aq = \begin{bmatrix} 1 & 1 & 1 & 1 & 1 & 1 & 1 & 1 \\ 1 & 1 & 1 & 1 & -1 & -1 & -1 & -1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Hadamard transform is performed on the pixel values P0 to P7 via the substantially simplified eight-stage Hadamard matrix to obtain:

$$\begin{bmatrix} 1 & 1 & 1 & 1 & 1 & 1 & 1 & 1 \\ 1 & 1 & 1 & 1 & -1 & -1 & -1 & -1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} * \begin{bmatrix} P0 \\ P1 \\ P2 \\ P3 \\ P4 \\ P5 \\ P6 \\ P7 \end{bmatrix} = \begin{bmatrix} DC \\ AC0 \\ 0 \\ 0 \\ 0 \\ 0 \\ 0 \\ 0 \end{bmatrix}$$

That is, the generated eight transformed values include one DC value, one AC value AC0 and remaining values of zero.

Figure 3D:
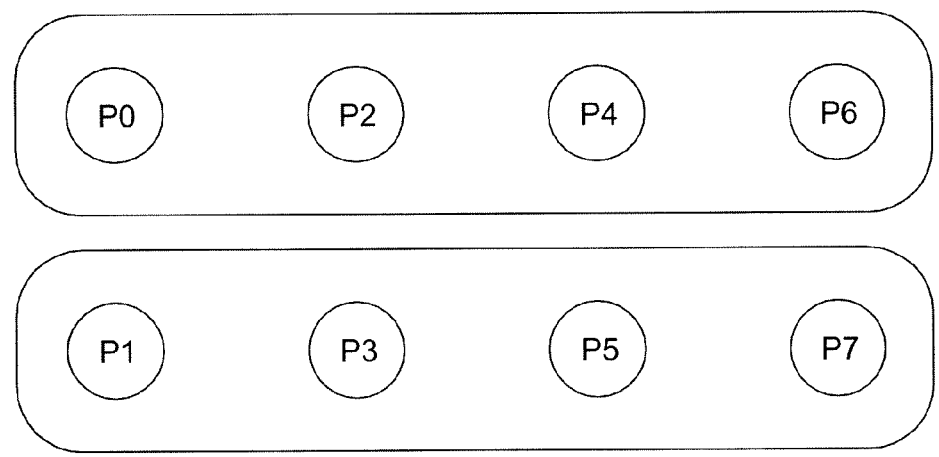
FIG. 3D is an illustration of dividing eight pixel values of a 2×4 matrix into two pixel groups.

In Example 4, G is equal to $2^{k-2}$ and each pixel group comprises four pixel values arranged as 1×4, i.e., the four pixel values correspond to a same scan line. Likewise, taking k equal to 3 as an example, eight pixel values regarded as an image block is divided to two pixel groups. Supposing that eight pixel values P0 to P7 correspond to two scan lines, the pixel values P0, P2, P4 and P6 form a pixel value, and the pixel values P1, P3, P5 and P7 form another pixel group, as shown in FIG. 3D. Similar to Example 3, a corresponding adjustment matrix Ar and a substantially simplified Hadamard matrix are represented below.

$$Ar = \frac{1}{4}\begin{bmatrix} 1 & 0 & 1 & 0 & 1 & 0 & 1 & 0 \\ 1 & 0 & 1 & 0 & 1 & 0 & 1 & 0 \\ 1 & 0 & 1 & 0 & 1 & 0 & 1 & 0 \\ 1 & 0 & 1 & 0 & 1 & 0 & 1 & 0 \\ 0 & 1 & 0 & 1 & 0 & 1 & 0 & 1 \\ 0 & 1 & 0 & 1 & 0 & 1 & 0 & 1 \\ 0 & 1 & 0 & 1 & 0 & 1 & 0 & 1 \\ 0 & 1 & 0 & 1 & 0 & 1 & 0 & 1 \end{bmatrix}$$

$$H_8 * Ar = \begin{bmatrix} 1 & 1 & 1 & 1 & 1 & 1 & 1 & 1 \\ 1 & -1 & 1 & -1 & 1 & -1 & 1 & -1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

When Hadamard transformed on the pixel values P0 to P7 via the substantially simplified Hadamard matrix, the generated transformed values include one DC value, one AC value AC0, and remaining values of zero.

In the second embodiment, in addition to the simplified Hadamard matrix applied for performing the Hadamard transform, the original un-simplified Hadamard matrix is also adopted to perform a Hadamard inverse transform, and thus each inverse transformed value is an average pixel value of a pixel group comprising an original pixel value corresponding to the inversed transformed value but not the original pixel value as shown in Formula 5:

$$H^{-1}*(H*A*M)=(H^{-1}*H)*(A*M)=A*M \quad (5)$$

In Formula 5, H and are respectively a Hadamard matrix and an inverse Hadamard matrix (e.g., $H^{-1}=H$), A is an adjustment matrix, M is a matrix composed of all pixel values contained in an image block, and $H*A*M$ is a Hadamard transform performed via a simplified Hadamard matrix $H*A$. In addition, $H^{-1}$ is multiplied by $H*A*M$ to perform the Hadamard inverse transform to obtain a result $A*M$, i.e., the adjustment matrix A is multiplied by M, such that each pixel value of the matrix M is transformed to an average pixel value of a pixel group comprising the pixel value—such condition needs to be satisfied by the abovementioned adjustment matrix as disclosed in the foregoing description. Therefore, the original $2^k$ pixel values are divided into G pixel groups, and G image blocks each having same pixel values are generated after direct transform of the simplified Hadamard matrix and inverse transform of the original Hadamard matrix. In other words, an image resolution becomes larger as G gets larger, and vice versa. It is to be noted that, in fact when the inverse Hadamard transform is performed, since at least one portion of the transformed values generated by the original direct transform (i.e., $H*A*M$) has been quantized, an error occurs between the inverse result and Formula 5, and is created due to the quantization but not being associated with the direct transform or the inverse transform.

As seen from the foregoing examples, by sacrifice of AC values of certain frequencies, the image compression rate becomes higher as G gets smaller, such that the image resolution becomes smaller and loss of image details is created. In practical applications, G is selected according to actual requirements, e.g., a larger G is selected when it is desired to increase the image resolution and to maintain more image details; a smaller G is selected when it is desired to increase the image compression rate and to reduce memory space.

In the second embodiment, the $2^k$ pixel values regarded as an image block for the Hadamard transform may be from a same scan line or $2^m$ scan lines. Under the situation that the number of the pixel groups stays unchanged (e.g., G stays unchanged), when the $2^k$ pixel values correspond to $2^m$ scan lines, the pixel groups may have various types of pixel arrangement approaches; when the $2^k$ pixel values correspond to the same scan line, the pixel group only has one pixel arrangement approach. For example, in Example 2 and Example 4, when $2^k=8$ pixel values correspond to two scan lines, the pixel group has pixel arrangement approaches of 1×4 and 2×2; when the eight pixel values correspond to a same scan line, the pixel group only has the pixel arrangement approach of 1×4.

Further, a configuration of the adjustment matrix is determined according to factors—an arrangement sequence of the $2^k$ pixel values of the first matrix, the value of G, and an arrangement approach of $2^k/G$ adjacent pixel values of each pixel group.

(1) For the arrangement sequence of the $2^k$ pixel values of the first matrix, when the arrangement sequence of the pixel values P0 to P7 of the first matrix M1 in Formula 2 and Formula 3, the adjustment matrixes Av and Ah are accordingly changed, and are also adopted to simplify the eight-stage Hadamard matrix.

(2) For the value of G, the configuration of the adjustment matrix is changed according to the value of G, e.g., supposing k is equal to 3, when G is equal to 4, the adjustment matrixes Av and Ah in Example 1 and Example 2 are accordingly obtained; when G is equal to 2, the adjustment matrixes Aq and Ar in Example 3 and Example 4 are obtained.

(3) For the arrangement approach of $2^k/G$ adjacent pixel values of each pixel group, in Example 1, when each pixel group comprises two vertical-adjacent pixel value, the adjustment matrix Av is obtained; when each pixel group comprises two horizontal-adjacent pixel value, the adjustment matrix Ah is obtained.

In conclusion, in addition to meeting the foregoing condition that each pixel value of the first matrix is transformed to an average pixel value of a pixel group comprising the pixel value to form the second matrix, the adjustment matrix also has the configuration determined according to the foregoing factors (1) to (3).

In an embodiment, the Hadamard transform unit 21 provides at least two configurations of adjustment matrixes and selects one for performing the Hadamard transform. More specifically, the Hadamard transform unit 21 selects a proper configuration of adjustment matrix according to a desired image resolution and a desired compression rate (e.g., a user-defined image resolution and a user-defined compression rate). In another embodiment, the Hadamard transform unit 21 estimates transform errors corresponding to respective Hadamard transform performed via different configurations of adjustment matrixes, and selects one configuration of adjustment matrix according to the transform errors. Each of the transform errors represents a difference of $2^k$ pixel values between before and after the direct Hadamard transform and the inverse Hadamard transform. Since after the direct Hadamard transform and the inverse Hadamard transform, each pixel value is transformed to an average pixel value of a pixel group comprising the pixel value (quantization errors are omitted for simplifying calculation). Therefore, the Hadamard transform unit 21 estimates the transform error corresponding to each configuration of adjustment matrix according to a difference between a pixel value and an average pixel value of a pixel group comprising the pixel value. For example, the Hadamard transform unit 21 estimates the transform error according to a sum of differences between respective pixel values and respective average values of pixel groups comprising the pixel values, or according to a maximum value of differences between respective pixel values and respective average values of pixel groups comprising the pixel values.

When each pixel group comprise two adjacent pixel values, the approach for estimating the transform errors is further simplified regardless of whether the two adjacent pixel values are vertical-adjacent or horizontal-adjacent arranged. Supposing each pixel group comprises two pixels P1 and P2, a difference $$\frac{P1 + P2}{|2 - P1|}$$

between the pixel P1 and the average pixel value $$\frac{P1 + P2}{2}$$

of the pixel group comprising the pixel P1 is added to a difference $$\frac{P1 + P2}{|2 - P2|}$$

between the pixel P2 and the average pixel value $$\frac{P1 + P2}{2}$$

to obtain |P1-P2|, which is a difference between the two pixels P1 and P2. Therefore, the foregoing step of estimating the transform errors according to a sum or a maximum value of differences between respective pixel values and respective average values of pixel groups comprising the pixel values is simplified to estimating the transform errors according to a sum or a maximum value of differences between two pixel values of each pixel group.

In this embodiment, the Hadamard transform unit 21 further generates a corresponding configuration record (having no format limitations), which is stored into the memory 22 and is for recording a configuration of adjustment matrix that is selected for performing the Hadamard transform. At this point, in order to achieve image compression, a sum of the overall bit number of quantized and un-quantized non-zero transformed values and the bit number of the configuration record needs to be smaller than the overall bit number of the $2^k$ pixel values. Since non-zero transformed values of difference frequencies are generated according to difference configurations of adjustment matrixes, the adjustment matrix Av includes non-zero transformed values DC, AC0 to AC2 in Example 1, and the adjustment matrix Ah includes non-zero transformed values DC, AC0, AC5 and AC6. Therefore, in subsequent image compression, it is determined frequencies of non-transformed values stored in the memory 22 according to the configuration record stored in the memory 22 to accurately perform the inverse Hadamard transform.

An advantage of this embodiment is that, regardless of using any configurations of adjustment matrix for performing the Hadamard transform, the same inverse Hadamard matrix (i.e., the original un-simplified Hadamard matrix) is implemented to subsequent inverse Hadamard transform. Therefore, a same inverse Hadamard transform circuit (not shown) is also applied to the subsequent image decompression to save hardware resources.

In the first embodiment, the approach of omitting the first n MSBs equal to zero of a magnitude part of a transformed value may also be adopted in the second embodiment, and details thereof shall not be describe for brevity.

Figure 4:
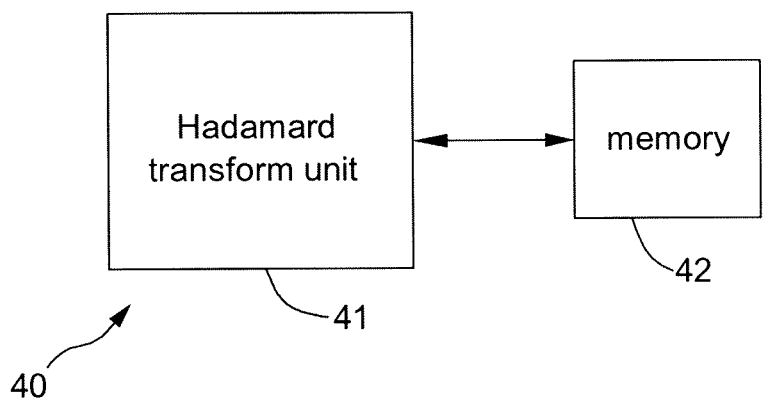
FIG. 4 is a block diagram of an image compression circuit in accordance with a third embodiment of the present invention.

FIG. 4 shows a block diagram of an image compression circuit in accordance with a third embodiment of the present invention. An image compression circuit 40 comprises a Hadamard transform unit 41 and a memory 42. The Hadamard transform unit 40 performs a Hadamard transform according to a first mode and a second mode, which are respectively disclosed in the first embodiment and the second embodiment. In other words, the third embodiment is a combination of the first embodiment and the second embodiment. More specifically, under the first mode, the Hadamard transform unit 41 performs the Hadamard transform on $2^k$ pixel values according to a $2^k \times 2^k$ Hadamard matrix to generate $2^k$ first transformed values, of which at least one first transformed value is quantized. Under the second mode, the Hadamard transform in unit 41 performs the Hadamard transform on the $2^k$ pixel values according to a product of the $2^k \times 2^k$ Hadamard matrix and a $2^k \times 2^k$ adjustment matrix to generate $2^k$ second transformed values, of which at least one second transformed value is zero. The memory 42 coupled to the Hadamard transform unit 41 stores all quantized and un-quantized first transformed values under the first mode, and stores all non-zero second transformed values under the second mode.

Further, under the first mode, each of the first transformed values has a magnitude part. Supposing that first n MSBs of a magnitude part of at least one third transformed value of the $2^k$ first transformed value are zero, the first n MSBs are omitted when the Hadamard transform unit stores the third transformed value into the memory 42, and a corresponding omit record is generated and is stored into the memory 42. In addition, the Hadamard transform unit 41 quantizes the third transformed value, and the quantized third transformed value does not comprise the first n MSBs. Under the second mode, when an overall bit number of non-zero second transformed values is not smaller than that of the $2^k$ pixel values, the Hadamard transform unit 41 quantizes the at least one non-zero second transformed value, such that the overall bit number of the quantized and un-quantized non-zero second transformed values is smaller than that of the $2^k$ pixel values. The at least one non-zero second transformed value is stored into the memory 42 after having been quantized. For the condition satisfied by the adjustment matrix adopted under the second mode as disclosed in the second embodiment, details thereof shall not be described for brevity.

Apart from combining the first embodiment and the second embodiment, the third embodiment also provides a method for selecting a proper mode to perform the Hadamard transform. The Hadamard transform unit 41 selects the first mode or the second mode according to differences between each pixel value of the $2^k$ pixel values and an average pixel value of a pixel group comprising the pixel value under the second mode. For example, the Hadamard transform unit 41 compares a sum of differences between each pixel value of the $2^k$ pixel values and an average pixel value of a pixel group comprising the pixel value with a threshold, and selects the first mode or the second mode according to the comparison result. More specifically, when the sum is smaller than the threshold, it means that a transform error of performing the Hadamard transform under the second mode is acceptable, and accordingly the second mode is selected; when the sum is not smaller than the threshold, it means that the transform error of performing the Hadamard transform under the second mode, and accordingly the first mode is selected. Alternatively, the Hadamard transform unit 41 can compares a maximum value of differences between each pixel value of the $2^k$ pixel values and an average pixel value of a pixel group comprising the pixel value with another threshold, and selects the first mode or the second mode according to the comparison result.

Another method for selecting a proper mode is that, the Hadamard transform unit 41 not only calculates differences between each pixel value of the $2^k$ pixel values and an average pixel value of a pixel group comprising the pixel value under the second mode, but also calculates differences between each first transformed value having been transformed via the inverse Hadamard transform and a corresponding pixel value of the $2^k$ pixel values under the first mode, and compares the two types of differences to select the first mode or the second mode. For example, the Hadamard transform unit 41 respectively calculates and compares two sums of the respective differences calculated under the first mode and the second mode to select the proper mode. The Hadamard transform unit 41 can also directly compares a maximum value of the differences calculated under the first mode and a maximum value of the differences calculated under the second mode to select the proper mode.

Figure 5:
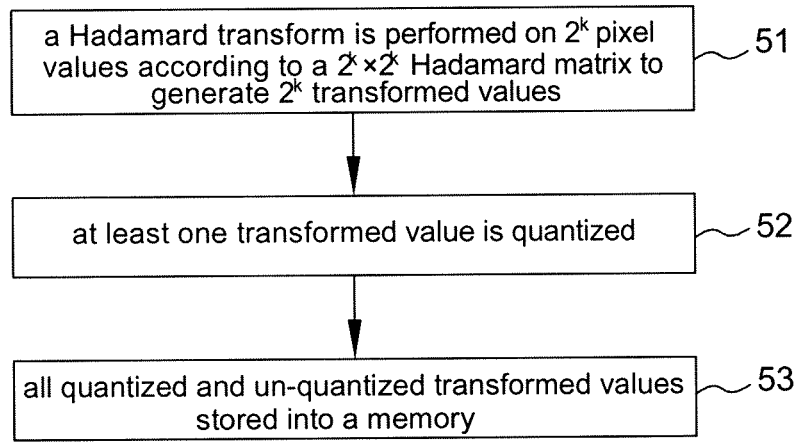
FIG. 5 is a flow chart of the image compression method in accordance with the first embodiment of the present invention.

FIG. 5 shows a flow chart of an image compression method in accordance with a first embodiment of the present invention. In Step 51, a Hadamard transform is performed on $2^k$ pixel values according to a $2^k \times 2^k$ Hadamard matrix to generate $2^k$ transformed values each comprising a magnitude part. In Step 52, at least one transformed value is quantized. In Step 53, all quantized and un-quantized transformed values are stored into a memory. When first n MSBs of a magnitude part of at least one first transformed value of the $2^k$ transformed values are zero, where n is a positive integer, the first n MSBs are omitted when the first transformed value is stored into the memory, and a corresponding omit record is generated and is stored into the memory.

Figure 6:
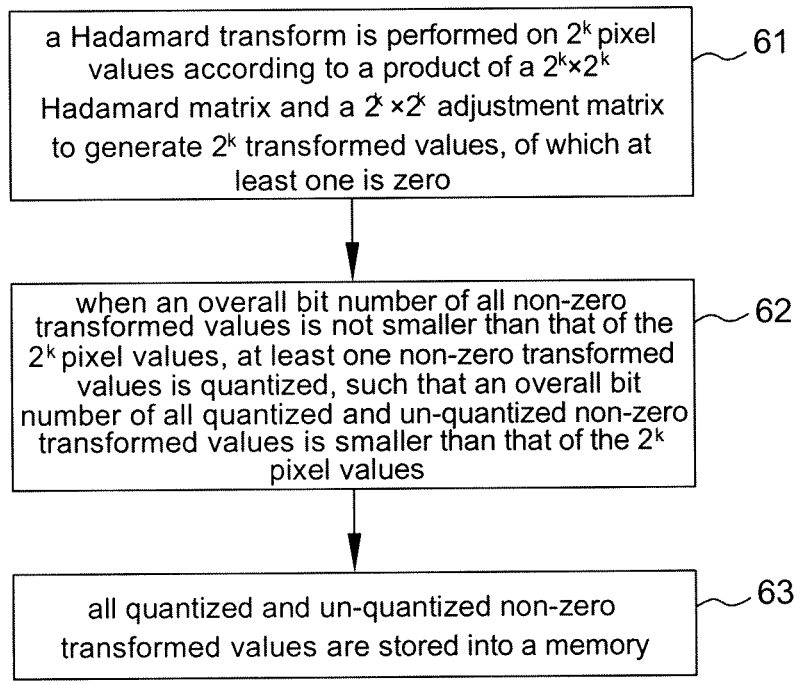
FIG. 6 is a flow chart of the image compression method in accordance with the second embodiment of the present invention.

FIG. 6 is a flow chart of an image compression method in accordance with a second embodiment of the present invention. The second embodiment of the image compression method corresponds to the second embodiment of the image compression circuit. In Step 61, a Hadamard transform is performed on $2^k$ pixel values according to a product of a $2^k \times 2^k$ Hadamard matrix and a $2^k \times 2^k$ adjustment matrix to generate $2^k$ transformed values, of which at least one is zero. In Step 62, when an overall bit number of all non-zero transformed values is not smaller than that of the $2^k$ pixel values, at least one non-zero transformed values is quantized, such that an overall bit number of all quantized and un-quantized non-zero transformed values is smaller than that of the $2^k$ pixel values. In Step 63, all quantized and un-quantized non-zero transformed values are stored into a memory. For the condition satisfied by the adjustment matrix adopted under the second mode as disclosed in the second embodiment of the image compression circuit, details thereof shall not be described for brevity.

In an embodiment, the adjustment matrix has at least two configurations, and a configuration record for recording a configuration of adjustment matrix for performing the Hadamard transform is involved in Step 61, where a sum of the overall bit number of non-zero transformed values and a bit number of the configuration record is smaller than the overall bit number of the $2^k$ pixel values. In Step 61, transform errors of the $2^k$ pixel values corresponding to performing the Hadamard transform via different configurations of adjustment matrixes are estimated, and one configuration of adjustment matrix is selected to perform the Hadamard transform. For estimating the transform errors as disclosed in the second embodiment of the image compression circuit, details thereof shall not be described for brevity.

Figure 7:
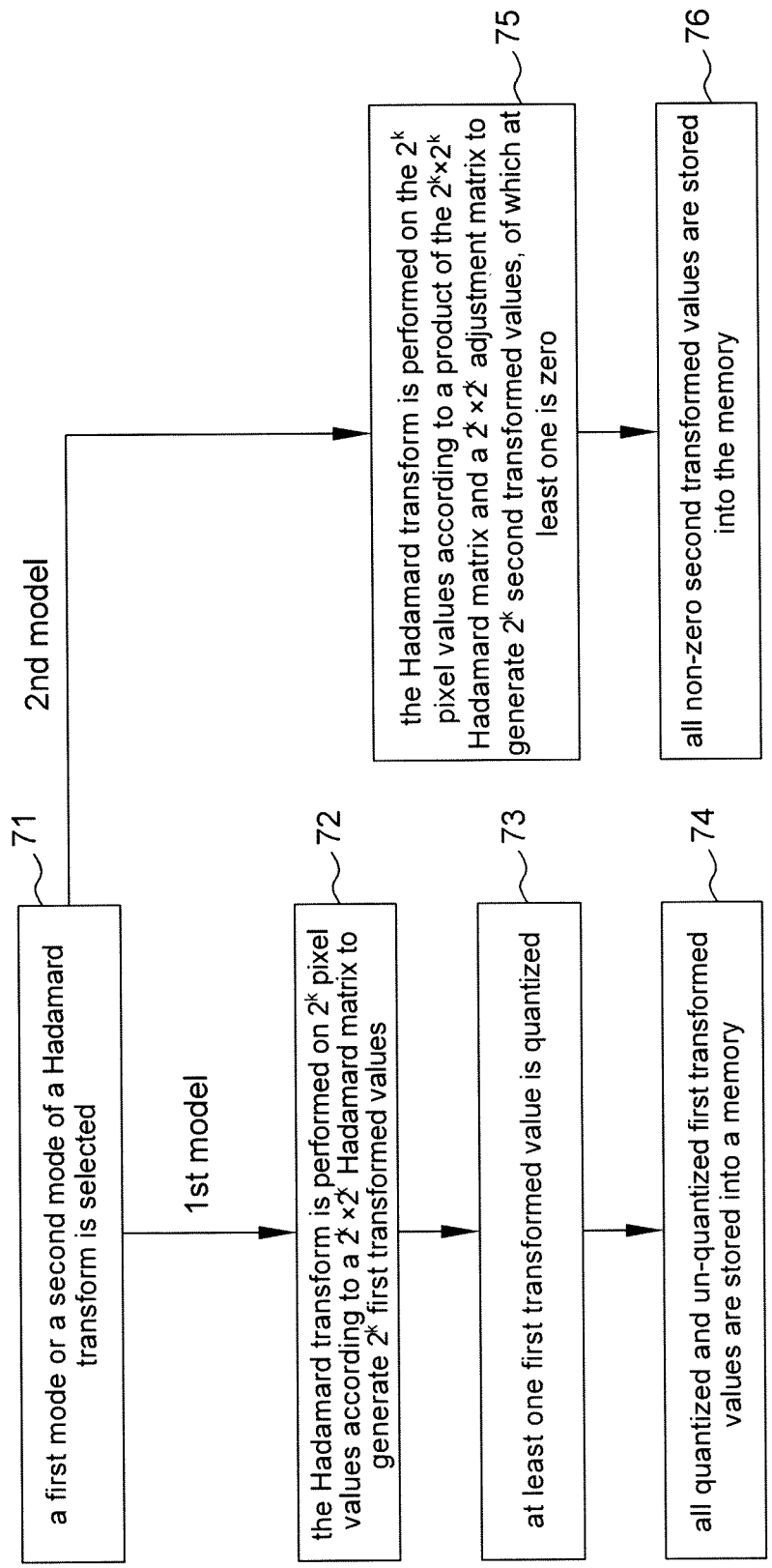
FIG. 7 is a flow chart of the image compression method in accordance with the third embodiment of the present invention.

FIG. 7 is a flow chart of an image compression method in accordance with a third embodiment of the present invention, which corresponds to the third embodiment of the image compression circuit. In Step 71, a first mode or a second mode of a Hadamard transform is selected. When the first mode is selected, the flow proceeds to Step 72; when the second mode is selected, the flow jumps to Step 75. In Step 72, the Hadamard transform is performed on $2^k$ pixel values according to a $2^k \times 2^k$ Hadamard matrix to generate $2^k$ first transformed values. In Step 73, at least one first transformed value is quantized. In Step 74, all quantized and un-quantized first transformed values are stored into a memory. In Step 75, the Hadamard transform is performed on the $2^k$ pixel values according to a product of the $2^k \times 2^k$ Hadamard matrix and a $2^k \times 2^k$ adjustment matrix to generate $2^k$ second transformed values, of which at least one is zero. In Step 76, all non-zero second transformed values are stored into the memory. For the condition satisfied by the adjustment matrix as disclosed in the second embodiment of the image compression circuit, details thereof shall not be described for brevity.

In Step 71, under the second mode, the first mode or the second mode of Hadamard transform is selected according to differences between respective pixel values and respective average values of pixel groups comprising the pixel values. Alternatively, under the first mode, differences between respective first transformed values having been transformed via the inverse Hadamard transform and respective corresponding pixel values of the $2^k$ pixel values under the first mode are compared with differences between respective pixel values and respective average values of pixel groups comprising the pixel values to select the first mode or the second mode. Further description of this embodiment is identical to the third embodiment of the image compression circuit, and details thereof shall not be described for brevity.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A Hadamard transform-based image compression method, comprises:
   selecting a first mode or a second mode of a Hadamard transform;
   when the first mode is selected, performing the Hadamard transform on $2^k$ pixel values according to a $2^k \times 2^k$ Hadamard matrix to generate $2^k$ first transformed values, with k being a positive integer, and quantizing at least one first transformed value of the $2^k$ first transformed values; and
   when the second mode is selected, performing the Hadamard transform on the $2^k$ pixel values according to a product of the $2^k \times 2^k$ Hadamard matrix and a $2^k \times 2^k$ adjustment matrix to generate $2^k$ second transformed values comprising at least one second transformed value of zero, wherein, the adjustment matrix satisfies a condition that, when the $2^k$ pixel values are divided into G pixel groups each comprising $2^k/G$ adjacent pixel values, where G is a positive integer, and the adjustment matrix is multiplied by a $2^k \times 1$ first matrix composed of the $2^k$ pixel values to convert the first matrix to a $2^k \times 1$ second matrix, each pixel value of the first matrix is converted to an average pixel value of a pixel group comprising the pixel value to form the second matrix, and under the second mode, the first mode or the second mode of the Hadamard transform is selected according to a difference between each pixel value of the $2^k$ pixel values and the average pixel value of the pixel group comprising the pixel value.

2. The method as claimed in claim 1, wherein when the first mode is selected, quantized and un-quantized first transformed values are stored into a memory;

when the second mode is selected, all non-zero second transformed values are stored into the memory.

3. The method as claimed in claim 2, wherein under the first mode, each first transformed value comprising a magnitude part; supposing that first n most significant bits (MSBs) of the magnitude part of at least a third transformed value of the $2^k$ first transformed values are zero, and n is a positive integer, the first n MSBs are omitted when the third transformed value is stored into the memory, and a corresponding omit record is generated and is stored into the memory.

4. The method as claimed in claim 3, wherein when the third transformed value is quantized, the quantized third transformed value does not comprise the first n MSBs.

5. The method as claimed in claim 2, wherein under the second mode, when an overall bit number of all non-zero second transformed values is not smaller than that of the $2^k$ pixel values, at least one non-zero second transformed value is quantized, such that the overall bit number of all quantized and un-quantized non-zero second transformed values is smaller than that of the $2^k$ pixel values, and at least one non-zero second transformed value is stored into the memory after having been quantized.

6. The method as claimed in claim 1, wherein the first mode or the second mode of the Hadamard transform is selected according to a sum of differences between each pixel value of the $2^k$ pixel values and the average pixel value of the pixel group comprising the pixel value under the second mode.

7. The method as claimed in claim 6, wherein the first mode or the second mode of the Hadamard transform is selected by comparing the sum of the differences between each pixel value of the $2^k$ pixel values and the average pixel value of the pixel group comprising the pixel value with a threshold.

8. The method as claimed in claim 1, wherein the first mode or the second mode of the Hadamard transform is selected according to a maximum value of differences between each pixel value of the $2^k$ pixel values and the average pixel value of the pixel group comprising the pixel value under the second mode.

9. The method as claimed in claim 8, wherein the first mode or the second mode of the Hadamard transform is selected by comparing a maximum value of differences between each pixel value of the $2^k$ pixel values and the average pixel value of the pixel group comprising the pixel value with a threshold.

10. The method as claimed in claim 1, wherein the first mode or the second mode of the Hadamard transform is selected by comparing a sum of differences between each first transformed value that are transformed via an inverse Hadamard transform and a corresponding pixel value of the $2^k$ pixel values under the first mode with a sum of differences between each pixel value of the $2^k$ pixel values and the average pixel value of the pixel group comprising the pixel value under the second mode.

11. The method as claimed in claim 1, wherein the first mode or the second mode of the Hadamard transform is selected by comparing a sum of differences between each first transformed value that are transformed via an inverse Hadamard transform and a corresponding pixel value of the $2^k$ pixel values under the first mode with a maximum value of differences between each pixel value of the $2^k$ pixel values and the average pixel value of the pixel group comprising the pixel value under the second mode.

\* \* \* \* \*